(12) United States Patent
Fratini et al.

(10) Patent No.: US 9,677,638 B2
(45) Date of Patent: Jun. 13, 2017

(54) MACHINE SUSPENSION SYSTEM HAVING LINK OSCILLATION LIMITER

(71) Applicant: Caterpillar Inc., Peoria, IL (US)

(72) Inventors: Anthony Ray Fratini, Cisco, IL (US); Ryan Wendell Shorthose, Oreana, IL (US); Craig Dale Goeppinger, Raleigh, NC (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/581,505

(22) Filed: Dec. 23, 2014

(65) Prior Publication Data

US 2016/0176257 A1  Jun. 23, 2016

(51) Int. Cl.
  *B60G 13/02* (2006.01)
  *F16F 1/373* (2006.01)
  *B60G 7/00* (2006.01)
  *B60G 13/00* (2006.01)

(52) U.S. Cl.
  CPC ............ *F16F 1/3735* (2013.01); *B60G 7/008* (2013.01); *B60G 13/005* (2013.01); *B60G 2204/129* (2013.01); *B60G 2204/148* (2013.01); *B60G 2204/45* (2013.01); *B60G 2206/11* (2013.01); *B60G 2300/02* (2013.01); *B60G 2300/026* (2013.01); *B60G 2300/09* (2013.01)

(58) Field of Classification Search
  CPC .......... F16F 1/34; F16F 1/3735; F16F 1/3732; B60G 13/005; B60G 2204/45
  See application file for complete search history.

(56) References Cited

U.S. PATENT DOCUMENTS

| | | | | | |
|---|---|---|---|---|---|
| 1,598,228 | A | * | 8/1926 | Wikander | F16F 1/34 213/40 S |
| 2,415,280 | A | * | 2/1947 | Fink | F16F 1/3732 267/140.3 |
| 2,948,526 | A | * | 8/1960 | Maier | B61G 11/06 267/135 |

(Continued)

FOREIGN PATENT DOCUMENTS

| | | | | |
|---|---|---|---|---|
| DE | 29918474 U1 | * | 4/2000 | ........... B60G 17/005 |
| JP | 10089392 | | 4/1998 | |

(Continued)

OTHER PUBLICATIONS

Takahiro Sano, Clip, Dec. 13, 2007, JPO, JP 2007-321900 A, Machine Translation of Description.*

(Continued)

*Primary Examiner* — James English
(74) *Attorney, Agent, or Firm* — Finnegan, Henderson, Farabow, Garrett & Dunner, LLP

(57) ABSTRACT

A suspension system is disclosed for use with a mobile machine. The suspension system may have a link with a first eye formed at a first end and a second eye formed at a second end, and a bearing disposed within each of the first eye and the second eye. The suspension system may also have a pin configured to pass through the first eye and the first bearing, and an oscillation limiter disposed on the pin adjacent the link. The oscillation limiter may be ring-shaped and split at a first side, and have a flex portion at a second side that allows the oscillation limiter to flex open and be installed on the pin from an annular side of the pin.

7 Claims, 3 Drawing Sheets

(56) References Cited

U.S. PATENT DOCUMENTS

| | | | | |
|---|---|---|---|---|
| 3,366,356 A * | 1/1968 | Fisher | ............... | F16B 9/02 16/2.1 |
| 3,451,705 A * | 6/1969 | Turpen | ............... | E05B 83/10 292/218 |
| 3,979,093 A * | 9/1976 | Madden | ............... | F16L 5/00 248/205.3 |
| 4,060,117 A * | 11/1977 | Chabot | ............... | F16B 39/00 285/81 |
| 4,652,167 A * | 3/1987 | Garman | ............... | F16C 11/02 29/434 |
| 4,960,252 A * | 10/1990 | Binder | ............... | F16L 3/08 174/153 G |
| 5,145,273 A * | 9/1992 | Hellon | ............... | B60G 21/0551 403/195 |
| 5,332,329 A * | 7/1994 | Hill | ............... | H02G 3/0658 174/153 G |
| 5,806,813 A * | 9/1998 | Binelli | ............... | F16L 3/1008 24/20 TT |
| 6,024,338 A * | 2/2000 | Koike | ............... | F16F 1/3732 248/615 |
| 6,126,119 A * | 10/2000 | Giangrasso | ............... | F16L 59/135 248/58 |
| 6,220,585 B1 * | 4/2001 | Heron | ............... | F16F 1/3732 267/152 |
| 6,266,852 B1 * | 7/2001 | Tai | ............... | B65D 63/1027 24/16 PB |
| 6,357,766 B1 | 3/2002 | Hall et al. | | |
| 6,471,179 B1 * | 10/2002 | Tousi | ............... | F16F 1/3732 248/634 |
| 7,063,342 B2 | 6/2006 | Seki | | |
| 7,065,875 B2 * | 6/2006 | Cai | ............... | B60G 21/0551 219/156 |
| 7,798,722 B2 * | 9/2010 | Wulf | ............... | F16F 1/3605 267/141.2 |
| 7,959,168 B2 | 6/2011 | Kiselis et al. | | |
| 8,192,104 B2 | 6/2012 | Mann et al. | | |
| 8,360,448 B2 | 1/2013 | Lariviere | | |
| 8,789,820 B2 * | 7/2014 | Yu | ............... | F16F 1/3732 267/141 |
| 9,068,619 B2 * | 6/2015 | Bogoslofski | ............... | B60R 9/10 |
| 2007/0120301 A1 * | 5/2007 | Domen | ............... | F16F 1/3732 267/152 |
| 2012/0043708 A1 * | 2/2012 | Burlage | ............... | F16F 1/3732 267/141 |

FOREIGN PATENT DOCUMENTS

| | | |
|---|---|---|
| JP | 2007321900 | 12/2007 |
| JP | 2013019472 | 1/2013 |
| KR | 2020000019818 | 11/2000 |

OTHER PUBLICATIONS

Ryan W. Shorthose at al., entitled "Limiter Ring", Design U.S. Appl. No. 29/512,807.

* cited by examiner

MACHINE SUSPENSION SYSTEM HAVING LINK OSCILLATION LIMITER

TECHNICAL FIELD

The present disclosure relates generally to a suspension system and, more particularly, to a machine suspension system having a link oscillation limiter.

BACKGROUND

Large machines such as haul trucks, vocational trucks, wheel loaders, motor graders, and other excavation equipment are each provided with a suspension system that distributes and transfers a load of the machine to one or more axles. A common suspension system used in these applications is known as a four-bar linkage system.

A four-bar linkage system comprises four different bars or links that are pinned at their ends to each other so that the links move in parallel planes. In a typical machine application, the frame of the machine can be considered the first link, the axle can be considered the second link, and two parallel links that connect the frame to the axle can he considered the third and fourth links. With this configuration, the axle can be constrained relative to the frame to limit movement along a particular arcuate trajectory. In other words, the axle may be allowed to move in a vertical direction relative to the frame, but may be limited from significant movement in a side-to-side or fore-aft direction of the frame. One or more shock absorbers may he located to cushion the vertical movement.

In some applications, it may be possible for a lateral spacing at ends of the links to be too great. In these situations, the links could tilt out of their associated planes of motion (i.e., fall over) and collide with surrounding geometry (e.g., with portions of the other links or clevises that support the links). This can cause damage to the links (e.g., to bearings inside the ends of the links), thereby reducing a life of the suspension system.

An exemplary suspension system is disclosed in U.S. Pat. No. 7,063,342 that issued to Seki on Jun. 20, 2006 ("the '342 patent"). The suspension system of the '342 patent includes a suspension arm having a through hole formed in one end. A bearing fits centrally in the through hole, and spacer members are inserted into opposing ends of the through hole. One end of the suspension arm is installed into the frame of a vehicle by means of a bolt inserted through the bearing and the spacer members. The spacers may function to position the suspension arm at a desired location.

Although the spacer members of the '342 patent may help to improve longevity of the suspension system, they may lack broad applicability. In particular, the spacer members may require significant time and effort to replace in the field. That is, installation of the spacer members may require disassembly of the bolt, in order for the bolt to pass through the ends of the spacer members. For this reason, it may only he practical to use the spacer members with a new machine, because replacing the spacer members of an existing machine could require that the machine be taken out of service. Extended machine downtime can result in lost productivity and profit.

The disclosed suspension system is directed to overcoming one or more of the problems set forth above and/or other problems of the prior art.

SUMMARY

In one aspect, the present disclosure is directed to a link oscillation limiter. The link oscillation limiter may include a ring-shaped body that is split at a first side to form two ends. The link oscillation limiter may also include a flex portion having a reduced annular thickness, being located at a second side of the ring-shaped body, and joining two halves of the ring-shaped body.

In another aspect, the present disclosure is directed to another oscillation link limiter. This oscillation link limiter may include a ring-shaped body formed from polyurethane to have a Shore A-durometer of about 80 and being split at a first side to form two ends. The oscillation link limiter may also include a circular recess formed within the ring-shaped to create a flex portion having a reduced annular thickness, the circular recess being located at a second side of the ring-shaped body and joining two halves of the ring-shaped body.

In yet another aspect, the present disclosure is directed to a suspension system. The suspension system may include a link with a first eye formed at a first end and a second eye formed at a second end, and a bearing disposed within each of the first eye and the second eye. The suspension system may also include a pin configured to pass through the first eye and the first bearing, and an oscillation limiter disposed on the pin adjacent the link. The oscillation limiter may he ring-shaped and split at a first side, and have a flex portion at a second side that allows the oscillation limiter to flex open and be installed on the pin from an annular side of the pin.

DETAILED DESCRIPTION

Figure 1:
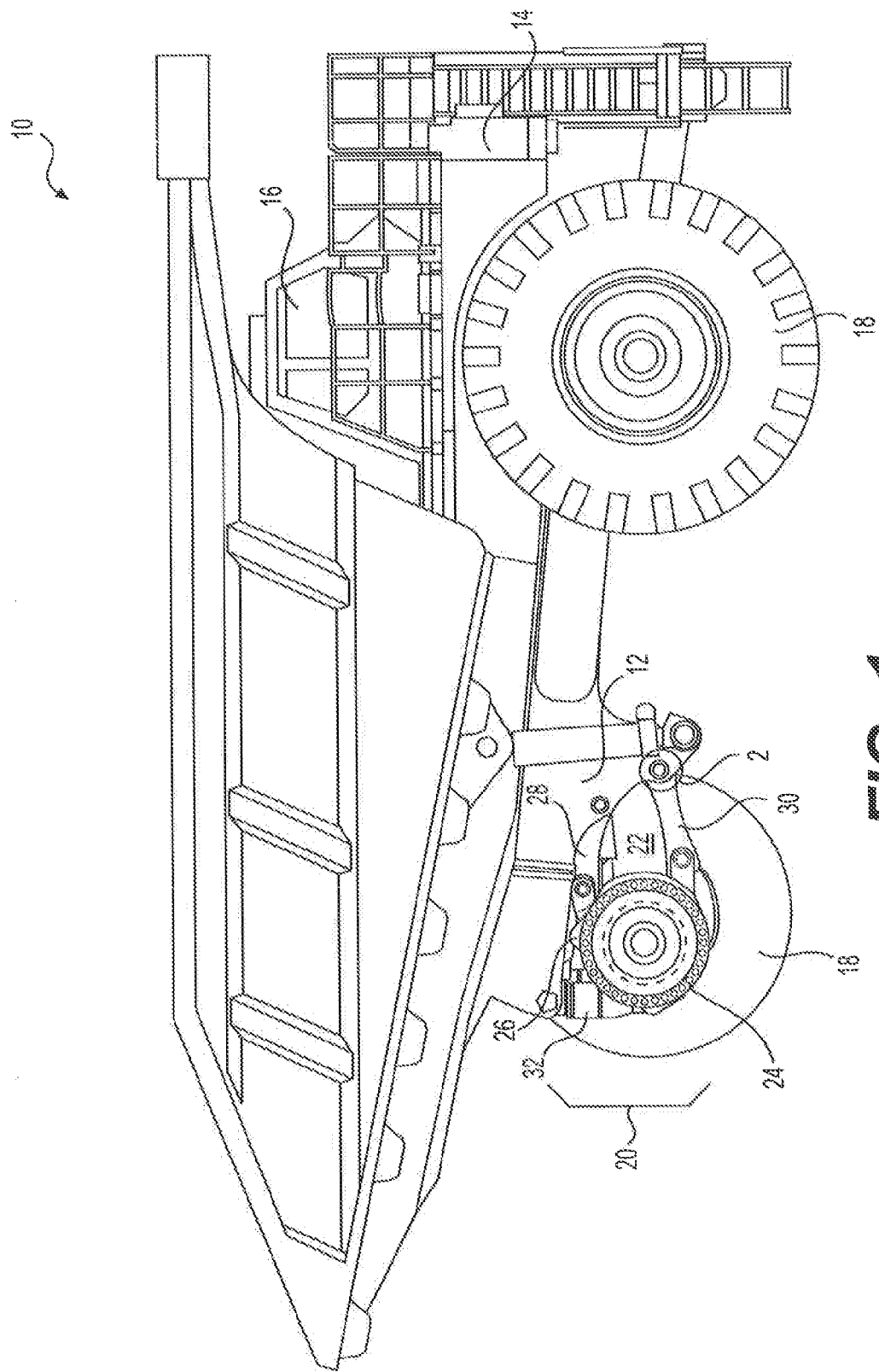
FIG. 1 is an isometric illustration of a machine having an exemplary suspension system.

FIG. 1 illustrates an exemplary embodiment of a machine 10. Machine 10 may be a mobile machine that performs some type of operation associated with an industry such as mining, construction, farming, or another industry known in the art. For example, machine 10 may be an earth moving machine such as an off-road haul truck (shown in FIG. 1), an on or off-highway mining truck, a wheel loader, or a motor grader. Machine 10 may include a machine frame 12 that supports a power source 14 and an operator station 16. Machine 10 may also include a plurality of traction devices 18 that are rotationally connected to machine frame 12 and driven by power source 14 to propel machine 10.

Traction devices 18 may embody wheels located at each side of machine 10. For example, four traction devices 18 (two on each side—removed from the right side of machine 10 for clarity) may be located at a rear-end of machine 10 and arranged in left and right pairs, while two traction devices 18 may be located at a front-end of machine. In the disclosed embodiment, the front traction devices 18 are steered, while the rear traction devices 18 are driven. It is contemplated, however, that any combination of traction devices 18 could be driven and/or steered, as desired.

Power source 14 may be a combustion engine, for example a diesel-fueled compression-ignition type of engine. Output from power source 14 may be directed to the rear traction devices 18 by way of a driveshaft 22 and left and right axles 24 (only right axle 24 shown in FIG. 2). A differential (not shown) disposed within a housing 26 may connect driveshaft 22 to axles 24. The differential may transmit power from driveshaft 22 to axles 24, while allowing the left axle 24 to rotate at a different speed than the right axle 24.

A suspension system 20 may be associated with the rear traction devices 18 and used to both cushion and distribute loads carried by machine 10. The disclosed suspension system 20 may be known as a four-bar type of suspensions system. In particular, frame 12 may function as a first bar or link and differential housing 26 may function as a second link, and suspension system 20 may include a third link 28 and a fourth link 30. Third and fourth links 28, 30 may be considered parallel links that each include a first end pivotally connected to frame 12 and a second end pivotally connected to differential housing 26. With this configuration, differential housing 26 (along with axles 24) may be constrained to follow a generally arcuate trajectory defined by the parallel pivoting of links 28, 30 about their first ends. In other words, differential housing 26 may be allowed to move vertically somewhat, but inhibited from significant movement in a fore/aft direction of machine 10. One or more shock absorbers 32 may be included as part of suspension system 20 and configured to dampen the vertical movement.

It should be noted that, because of the locations of links 28 and 30 relative to a ground surface beneath machine 10, links 28 and 30 may experience different operating conditions. For example, link 30, being located closer to the ground surface, may be exposed to higher levels of moisture, dirt, and debris. Similarly, the second ends of both links 28, 30 that are connected to differential housing 26 may experience higher levels of moisture, dirt, and debris than the first ends that are connected to frame 12. For these reasons, link 30 may experience more wear than link 28, and the second ends may experience more wear than the first ends.

Figure 2:
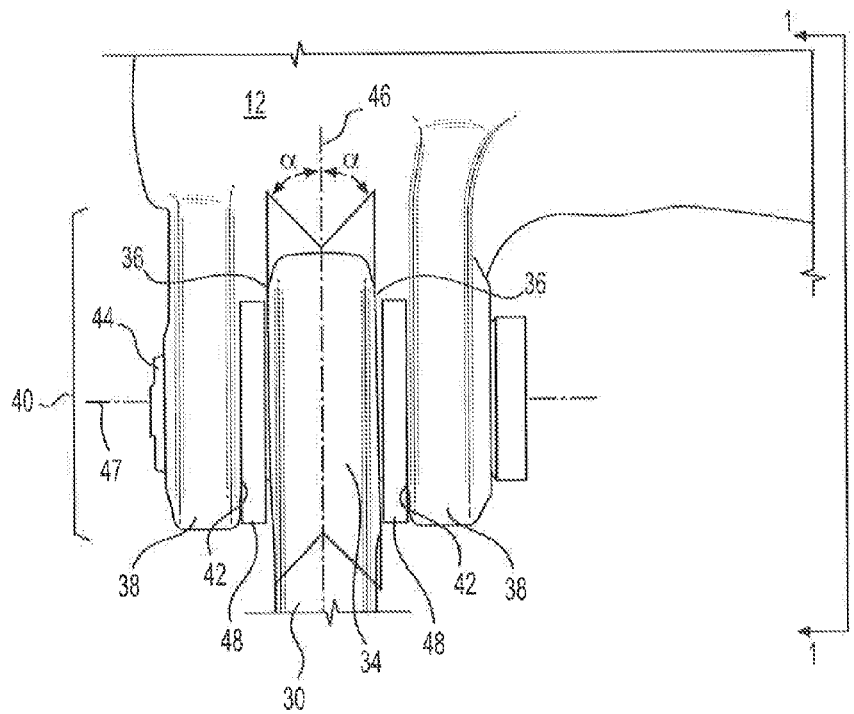
FIGS. 2 and 3 are isometric and cut-away view illustrations, respectively, of an exemplary portion of the suspension system of FIG. 1.
Figure 3:
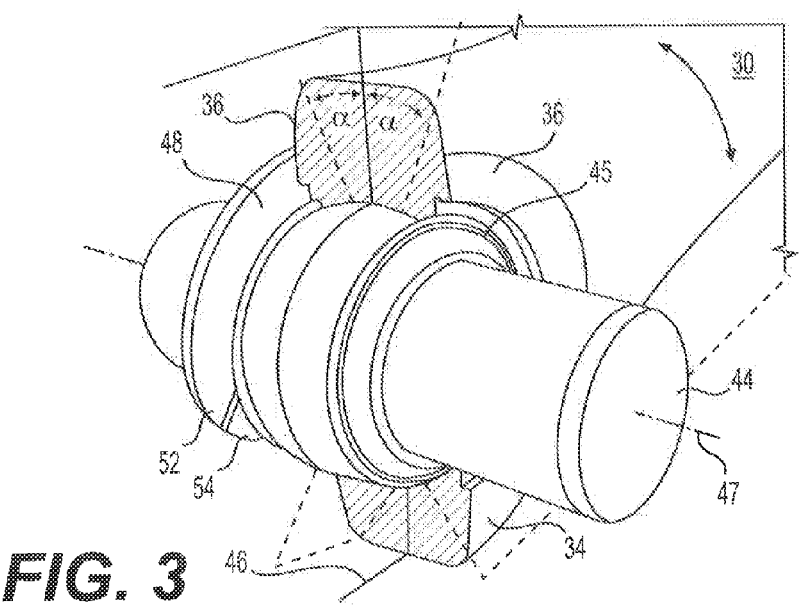

An exemplary connection of the first end of link 30 to frame 12 is illustrated in FIGS. 2 and 3. It should he noted, however, that link 28 may be connected in similar manner to frame 12 and/or that the second ends of links 28, 30 may he connected in similar manner to differential housing 26. Each end of link 30 may include an eye 34 having a bore (not shown) formed therein. Opposing side surfaces 36 of eye 34 may be machined flat and configured to slide between ears 38 of a clevis 40 that is integral with and protrudes from frame 12. Ears 38 may similarly include opposing side surfaces 42 that are machined flat and oriented to face side surfaces 36 of eye 34. In the disclosed embodiment, surfaces 42 may have outer diameters that are smaller than outer diameters of surfaces 36.

A fastener (e.g., a pin, a sleeve, a bolt, etc.) 44 may pass through ears 38 and the bore of eye 34, thereby retaining link 30 in place and allowing link 30 to rotate relative to clevis 40. A bearing 45 may be located within the bore of eye 34, and configured to reduce friction associated with the rotational movement of link 30. In some embodiments, bearing 45 is a spherical plane bearing that, in addition to allowing rotation within a plane 46 that is orthogonal to an axis 47 of fastener 44, may also allow some side-to-side tilting of link 30. In particular, link 30 may tilt through an angle α. This tilting may allow for some stackup of manufacturing tolerances and assembly misalignments, while also still providing for desired movement of differential housing 26 (and axles 24).

In some situations, the amount of side-to-side tilting could be significant. For example, in worst-case scenarios, the tolerance stackup and/or misalignment between components (e.g., between ears 38 of clevis 40) could allow link 30 to tilt too far to one side. A number of different things can happen when link 30 tilts too far. In particular, as link 30 tilts to one side past a threshold amount, a greater amount of moisture, dirt, and debris may come into contact with bearing 45 situated inside eye 34. When this happens, bearing 45 may wear at a greater rate and/or seize. In addition, it may be possible for portions of eye 34 to come into contact with surrounding components, causing eye 34 to crack or break. For this reason, the side-to-side tilting motion of link 30 may need to be limited in some situations.

Suspension system 20 may include one or more oscillation link limiters ("limiters") 48 that are configured to limit an amount of the side-to-side tilting of link 30. One link limiter 48 may be positioned at one or both sides of eye 34 (only one limiter 48 shown in FIG. 3 for clarity), and sandwiched between surfaces 36 and 42. The location and configuration of limiters 48 may reduce an amount of axial space between ears 38 through which link 30 may tilt. Link limiters 48 may be configured to limit the tilting of link 30 to an angle a that is less than 7°. In other words, with link limiters 48 in place, link 30 may tilt out of plane 46 to the left and right by up to +/−7°. Although intended primarily to be used at only the first end of link 30 (i.e., no limiters 48 being located at the second end), where a reduced level of contamination may allow longevity of limiters 48, it is contemplated that limiters 48 could alternatively be used at both ends or at only the second end of link 30, if desired, In addition to limiting the tilting of link 30, limiters 48 may also inhibit ingress of contamination to bearing 45 inside eye 34.

Limiters 48 may be fabricated from a material that resists fracture during deformation, has high force load transference, and/or does not bind when sheared between surfaces 36 and 42. For example, limiters 48 may be fabricated from an elastomeric material and have a Shore-A durometer of about 60-90. In the disclosed example, limiters 48 are fabricated from polyurethane and have a Shore-A durometer of about 80.

Figure 4:
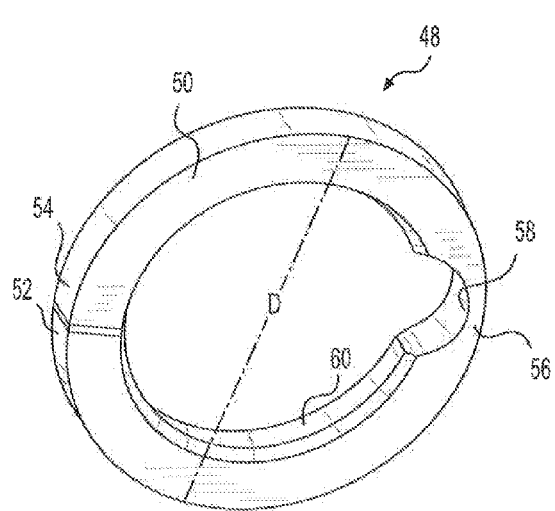
FIGS. 4-6 are isometric, front, and cross-sectional view illustrations, respectively, of an oscillation link limiter that may be used in conjunction with the suspension system of FIGS. 1-3.
Figure 5:
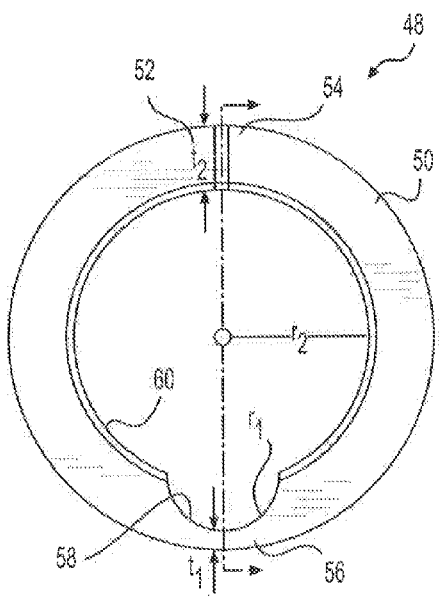
Figure 6:
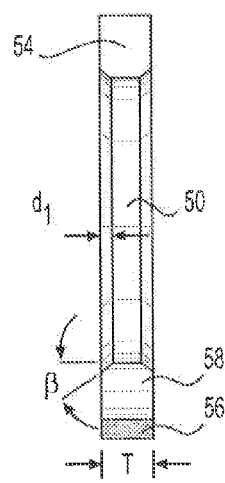

An exemplary limiter 48 is disclosed in FIGS. 4-6. As shown in these figures, limiter 48 may include a ring-shaped (e.g., circular and hollow) body 50 that is split at a first side to form two ends 52, 54 and that has a flex portion 56 formed at a second side opposite the first side. Flex portion 56 may reduce a stiffness of body 50 at the second side, allowing for ends 52 and 54 to be pulled away from each other without fracturing body 50. That is, when ends 52 and 54 are pulled apart, body 50 may flex open at flex portion 56. As will be explained in more detail below, the pulling apart of ends 52 and 54 may allow limiter 48 to be installed over fastener 44 (e.g., from an annular side of fastener 44—referring to FIGS. 2 and 3) after link 30 has already been assembled into clevis 40.

Flex portion 56 may be formed in a number of different ways. In the disclosed embodiment, flex portion 56 is formed by cutting a circular recess 58 into an inner annular surface 60 of body 50. Recess 58 may be designed to provide a desired degree of flexibility, while also maintaining enough strength for longevity of limiter 48. It is contemplated that flex portion 56 could alternatively be formed (e.g., molded) as a gradual reduction in diameter/thickness at the second side, if desired. Other shapes and forms of fabrication may also be possible.

The dimensions of body 50 may be selected to provide for desired performance of limiter 48. For example, recess 58 may have a radius $r_1$ and a center located to provide an annular thickness $t_1$ at flex portion 56. In the disclosed embodiment, a ratio of an internal radius r2 of body 50 to the radius $r_1$ may be about 1:35-0.4. In addition, the annular thickness $t_1$ may be about ⅓ of an annular thickness $t_2$ at ends 52, 54. An axial thickness T of body 50 may be about 10-42% of an outer diameter D. The outer diameter D may be less than the outer diameters of surfaces 36 and 42 (referring to FIG. 2). Body 50 may be chamfered at internal edges of surface 60 to avoid damaging engagement with other components of suspension system 20 that could cause excessive wear. In the disclosed embodiment, an angle β of the chamfer may be about 45°, such that an axial chamfer dimension $d_1$ is about ⅕ of an axial thickness T of body 50. The axial thickness T of body 50 may be about ⅓-¼ of an axial thickness of eye 34 (referring to FIG. 2). Deviation from these relationships could result in body 50 being too stiff, thereby causing fracture at flex portion 56, or too flexible, thereby allowing limiters 48 to open unintentionally and fall off of fastener 44. It should be noted that the term "about" used in reference to the dimensions of limiter 48 may be construed to mean within engineering tolerances.

INDUSTRIAL APPLICABILITY

The disclosed suspension system may be applicable to any mobile machine where some movement of an axle relative to a frame is desired. The disclosed suspension system may have longevity provided by way of oscillation limiters associated with one or more links. The oscillation limiters may take up axial space at one or more ends of the link, thereby limiting an amount of side-to-side tilting of the link. By limiting this tilting, the link may be protected from damage and excessive wear.

It will be apparent to those skilled in the art that various modifications and variations can be made to the disclosed suspension system without departing from the scope of the disclosure. Other embodiments of the suspension system will be apparent to those skilled in the art from consideration of the specification and practice of the suspensions system disclosed herein. For example, although the disclosed suspension system is shown and described as being associated with a mechanically driven machine, it is contemplated that the suspension system could similarly be used with an electric drive machine. It is intended that the specification and examples be considered as exemplary only, with a true scope being indicated by the following claims and their equivalents.

What is claimed is:

1. A link oscillation limiter, comprising:
    a ring-shaped body having an inner annular surface, the ring shaped body being split at a first side to form two ends;
    a flex portion having a reduced annular thickness and formed on the inner annular surface of the ring shaped body, the flex portion being located at a second side of the ring-shaped body, and joining two halves of the ring-shaped body; and
    a circular recess formed within the ring-shaped body at the flex portion,
    wherein an axial thickness of the ring-shaped body is about 10-12% of an outer diameter of the ring-shaped body.

2. The link oscillation limiter of claim 1, wherein a ratio of an internal radius of the ring-shaped body to an internal radius of the circular recess is about 1:.35-0.4.

3. The link oscillation limiter of claim 1, wherein the annular thickness of the flex portion is about ⅓ of an annular thickness of the ring-shaped body at the two ends.

4. The link oscillation limiter of claim 1, wherein:
    the ring-shaped body has generally flat opposing axial end surfaces; and
    an internal edge of each of the generally flat opposing axial end surfaces is chamfered.

5. The link oscillation limiter of claim 4, wherein an axial chamfer dimension at each internal edge is about ⅕ of an axial thickness of the ring-shaped body.

6. The link oscillation limiter of claim 1, wherein the ring-shaped body is made from an elastomer having a Shore A-durometer of about 80.

7. The link oscillation limiter of claim 6, wherein the elastomer is polyurethane.

* * * * *